United States Patent
Marcus et al.

(10) Patent No.: US 9,104,011 B2
(45) Date of Patent: Aug. 11, 2015

(54) LIGHT COLLECTOR DEVICES

(75) Inventors: Matthew S. Marcus, Plymouth, MN (US); Bernard S. Fritz, Eagan, MN (US)

(73) Assignee: Honeywell International Inc., Morristown, NJ (US)

(*) Notice: Subject to any disclaimer, the term of this patent is extended or adjusted under 35 U.S.C. 154(b) by 264 days.

(21) Appl. No.: 13/219,242

(22) Filed: Aug. 26, 2011

(65) Prior Publication Data

US 2013/0048844 A1 Feb. 28, 2013

(51) Int. Cl.
*G02B 19/00* (2006.01)

(52) U.S. Cl.
CPC ........ *G02B 19/0019* (2013.01); *G02B 19/0038* (2013.01); *G02B 19/0076* (2013.01)

(58) Field of Classification Search
CPC ........... G02B 19/0019; G02B 19/0038; G02B 19/0076; G01D 5/34; H01J 3/14
USPC .......... 250/216, 221; 126/569, 704, 600, 683, 126/699, 700, 701; 136/246, 247, 214, 215, 136/243, 244

See application file for complete search history.

(56) References Cited

U.S. PATENT DOCUMENTS

| | | | | |
|---|---|---|---|---|
| 5,877,500 A | * | 3/1999 | Braig et al. | 250/353 |
| 7,110,107 B2 | * | 9/2006 | Martin et al. | 356/246 |
| 7,683,310 B1 | * | 3/2010 | Sinclair et al. | 250/216 |
| 8,278,728 B2 | * | 10/2012 | Murshid | 257/448 |

* cited by examiner

*Primary Examiner* — Georgia Y Epps
*Assistant Examiner* — Don Williams
(74) *Attorney, Agent, or Firm* — Brooks, Cameron & Huebsch, PLLC

(57) ABSTRACT

Light collector devices and methods of operating light collector devices are described herein. One or more embodiments include a plurality of apertures, and a detector coupled to each of the plurality of apertures.

14 Claims, 2 Drawing Sheets

LIGHT COLLECTOR DEVICES

TECHNICAL FIELD

The present disclosure relates to light collector devices and methods of operating light collector devices.

BACKGROUND

Light collector devices can be used to collect, detect, and/or measure light in a number of different applications. For example, light collector devices may be used to collect, detect, and/or measure light in non-imaging applications, which may involve the collection, detection, and/or measurement of small (e.g., faint) amounts of light.

Previous light collector devices may include a single large area aperture to collect small amounts of light. However, because the length of the optical axis (e.g., optical track length) associated with the aperture may increase as the area of the aperture increases, such previous light collector devices having a single large area aperture may also have a long optical axis (e.g., a large optical track length). As an example, a light collector device that includes a single large area aperture having a diameter of six inches may have an optical track length of at least nine inches.

The long optical axis associated with the single large area aperture of such previous light collector devices may increase the size (e.g., the area and/or volume) of such previous light collector devices. Because such previous light collector devices may have a large size, they may not be amenable to small structure integration.

DETAILED DESCRIPTION

Figure 1A:
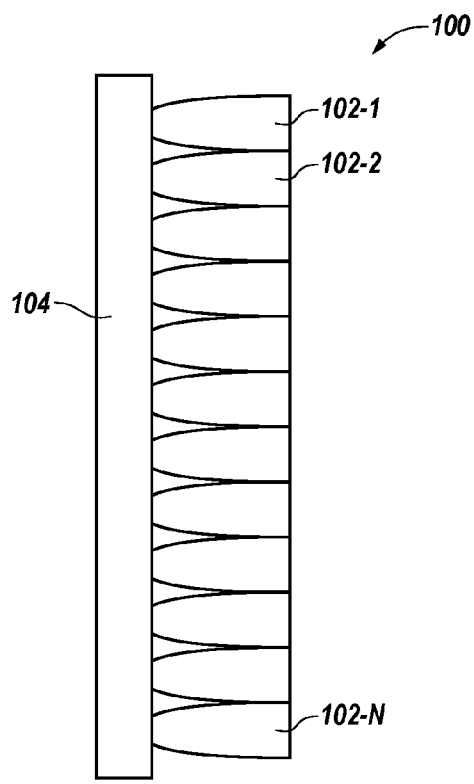
FIG. 1A illustrates a side view of a portion of a light collector device in accordance with one or more embodiments of the present disclosure.

Light collector devices and methods of operating light collector devices are described herein. One or more embodiments include a plurality of apertures, and a detector coupled to each of the plurality of apertures.

Light collector devices in accordance with one or more embodiments of the present disclosure may have a short optical axis (e.g., a decreased optical track length) as compared to previous light collector devices (e.g., light collector devices having a single large area aperture). Accordingly, light collector devices in accordance with one or more embodiments of the present disclosure may have a decreased size (e.g., a decreased area and/or volume) as compared to previous light collector devices. As such, light collector devices in accordance with one or more embodiments of the present disclosure may be amenable to small structure integration. Further, light collector devices in accordance with one or more embodiments of the present disclosure may be able to efficiently collect, detect, and/or measure light, including, for example, small (e.g., faint) amounts of light.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of apertures" can refer to one or more apertures. Additionally, the designator "N" as used herein, particularly with respect to reference numerals in the drawings, indicates that a number of the particular feature so designated can be included with a number of embodiments of the present disclosure.

Figure 1B:
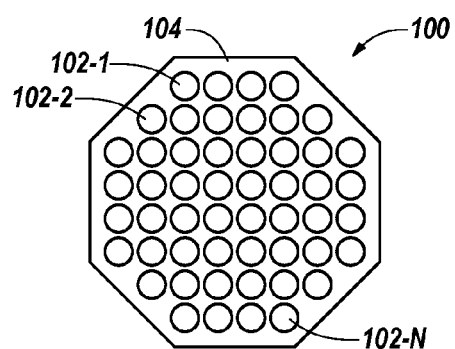
FIG. 1B illustrates a front view of a portion of a light collector device in accordance with one or more embodiments of the present disclosure.

FIG. 1A illustrates a side view of a portion of a light collector device 100 in accordance with one or more embodiments of the present disclosure. FIG. 1B illustrates a front view of a portion of light collector device 100 in accordance with one or more embodiments of the present disclosure.

Light collector device 100 can be, for example, a non-imaging light collector device (e.g., a light collector device that is not used to create, produce, or generate an image of an object or item). That is, light collector device 100 can be a light collector device used for non-imaging applications such as, for instance, light detection applications, optical communications, single pixel imaging, and/or optical gas sensing, among other non-imaging applications.

As shown in FIGS. 1A and 1B, light collector device 100 includes a plurality of (e.g., at least two) apertures 102-1, 102-2, . . . 102-N, and a detector 104 coupled to (e.g., adjacent) the plurality of apertures 102-1, 102-2, . . . , 102-N. Apertures 102-1, 102-2, . . . , 102-N can be any type of hole or opening through which light can propagate (e.g., travel). For example, apertures 102-1, 102-2, . . . 102-N can be lenses (e.g., Fresnel lenses) and/or optical concentrators (e.g., apertures that concentrate the light as the light propagates through).

In the embodiment illustrated in FIGS. 1A and 1B, apertures 102-1, 102-2, . . . , 102-N are Winston cones (e.g., apertures having a parabolic shape and a reflective inner surface). However, embodiments of the present disclosure are not limited to a particular type of aperture. For example, in some embodiments, apertures 102-1, 102-2, . . . , 102-N can be different types of apertures.

In the embodiment illustrated in FIGS. 1A and 1B, each of apertures 102-1, 102-2, . . 102-N are a substantially similar (e.g., the same) size. That is, each of apertures 102-1, 102-2, . . . 102-N have substantially similar dimensions (e.g., diameter, length, width, area, optical track length, etc.). For instance, in some embodiments, apertures 102-1, 102-2, . . . 102-N can each have a diameter of approximately 0.1 inch. However, embodiments of the present disclosure are not limited to a particular aperture size. For example, in some embodiments, apertures 102-1, 102-2, . . . 102-N can be different sizes.

As shown in FIGS. 1A and 1B, each of apertures 102-1, 102-2, . . . 102-N can be substantially similar (e.g., the same). For example, apertures 102-1, 102-2, . . . 102-N can be the same type of aperture and/or have substantially similar dimensions. However, embodiments of the present disclosure are not so limited (e.g., apertures 102-1, 102-2, . . . , 102-N can be different types and/or have different dimensions), as previously described herein.

Apertures 102-1, 102-2, . . . , 102-N can have an optical axis associated therewith. The optical axis can be, for example, a line that defines the path along which light propagates through light collector device 100. The length of the optical axis (e.g., the track length) associated with apertures 102-1, 102-2, . . . 102-N may scale with the diameter of apertures 102-1, 102-2, . . . 102-N (e.g., the length of the optical axis may increase as the diameter increases). For instance, the length of the optical axis associated with apertures 102-1, 102-2, . . . 102-N may be approximately 1.5 times greater than the diameter of apertures 102-1, 102-2, . . . , 102-N.

Because light collector device 100 includes a plurality of apertures, light collector device 100 may have a short optical axis (e.g., a decreased optical track length) as compared to previous light collector devices (e.g., light collector devices having a single large area aperture). Accordingly, light collector device 100 may have a decreased size (e.g., a decreased area and/or volume) as compared to previous light collector devices.

As an example, the volume of light collector device may be approximately 20 cubic centimeters, while the volume of previous light collector devices having a single large area aperture (e.g., a large area aperture having a diameter of approximately five or six inches) may be approximately 147 cubic centimeters. As such, light collector device 100 may be amenable to small structure integration. Further, light collector device 100 may be able to efficiently collect, detect, and/or measure light, including, for example, small (e.g., faint) amounts of light.

In the embodiment illustrated in FIG. 1A, a side of each aperture 102-1, 102-2, . . . 102-N is adjacent detector 104. The opposite side of each aperture 102-1, 102-2, . . . 102-N (e.g., the side of each aperture 102-1, 102-2, . . . 102-N that is opposite detector 104) can be a substantially similar length away from the side adjacent detector 104, as shown in FIG. 1A. Apertures 102-1, 102-2, . . . , 102-N will be further described herein (e.g., in connection with FIG. 2).

In some embodiments, detector 104 can be a single detector. In such embodiments, the single detector can be coupled to a single aperture or a plurality of apertures (e.g., apertures 102-1, 102-2, . . . 102-N). In some embodiments, detector 104 can include a plurality (e.g., an array) of detectors.

In some embodiments, light collector device 100 can include less than 400 apertures. For example, light collector device 100 can include 278 apertures. Having less than 400 apertures can reduce and/or eliminate noise issues associated with light collector device 100. For example, having less than 400 apertures can reduce the noise level associated with detector 104. However, embodiments of the present disclosure are not limited to a particular number of apertures.

Detector 104 can be any type of detector that can detect, sense, and/or measure light. For example, detector 104 can be a photodetector (e.g., a photodetector array having a number of p-n junctions). However, embodiments of the present disclosure are not limited to a particular type of detector.

During operation of light collector device 100, light can propagate (e.g., travel) through apertures 102-1, 102-2, . . . 102-N. For example, light can enter apertures 102-1, 102-2, . . . 102-N through the side of apertures 102-1, 102-2, . . . , 102-N that is opposite detector 104, and exit apertures 102-1, 102-2, . . . , 102-N through the side of apertures 102-1, 102-2, . . ., 102-N that is adjacent detector 104. The light can illuminate detector 104 after the light propagates through apertures 102-1, 102-2, . . . , 102-N.

In some embodiments, the light can propagate through apertures 102-1, 102-2, . . . , 102-N concurrently (e.g., at the same time). In some embodiments, the light can propagate through each of apertures 102-1, 102-2, . . . 102-N. In some embodiments, the light can propagate through a portion of apertures 102-1, 102-2, . . . , 102-N (e.g., the light may not propagate through one or more of the apertures).

Figure 2:
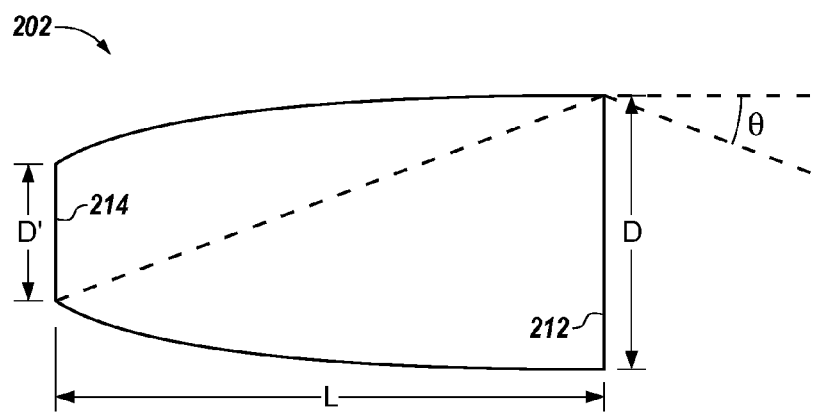
FIG. 2 illustrates an aperture of a light collector device in accordance with one or more embodiments of the present disclosure.

FIG. 2 illustrates an aperture 202 of a light collector device (e.g., light collector device 100 previously described in connection with FIG. 1) in accordance with one or more embodiments of the present disclosure. Aperture 202 can be, for example, apertures 102-1, 102-2, . . . , 102-N previously described in connection with FIG. 1 (e.g., aperture 202 can be a Winston cone).

As shown in FIG. 2, aperture 202 includes a first side 212 and a second side 214 opposite first side 212. First side 212 can be, for example, the side that is opposite detector 104 previously described in connection with FIG. 1, and second side 214 can be, for example, the side that is adjacent detector 104 previously described in connection with FIG. 1.

As shown in FIG. 2, first side 212 has a first length D, and second side 214 has a second length D'. Second length D' may be less than first length D, as illustrated in FIG. 2. In the embodiment illustrated in FIG. 2, the length between first side 212 and second side 214 (e.g., the width of aperture 202) is represented as L.

In some embodiments, length L, first length D, and second length D' can be related by the following equations:

$$D' = D(\sin \theta)$$

$$D/D' < 1/(\sin^2 \theta)$$

$$L = 0.5(D+D')(\cot \theta)$$

where θ is the angle (in degrees) illustrated in connection with the dashed lines in FIG. 2.

As an example, first length D can be approximately 0.3 centimeters, second length D' can be approximately 0.05 centimeters, length L can be approximately 1.0 centimeters, and angle θ can be approximately 10 degrees. However, embodiments of the present disclosure are not limited to particular dimensions for first length D, second length D', length L, or angle θ.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A light collector device, comprising:
    a plurality of Winston cones, wherein each of the plurality of Winston cones includes:
        a first side through which light enters, wherein the first side has a first length; and
        a second side through which light exits, wherein the second side is opposite the first side and has a second length that is less than the first length; and
    a single detector, wherein:
        the single detector is positioned in direct contact with the second side of each of the plurality of Winston cones through which light exits; and
        the single detector is positioned outside of each of the plurality of Winston cones.

2. The device of claim 1, wherein the single detector is a photodetector.

3. The device of claim 1, wherein each of the plurality of Winston cones are substantially similar.

4. The device of claim 1, wherein:
    each of the plurality of Winston cones have a diameter and an optical axis associated therewith; and
    a length of the optical axis associated with each of the plurality of Winston cones is approximately 1.5 times greater than the diameter of that respective Winston cone.

5. The device of claim 1, wherein at least one of the plurality of Winston cones has a diameter of approximately 0.1 inch.

6. The device of claim 1, wherein at least one of the plurality of Winston cones is an optical concentrator.

7. The device of claim 1, wherein the device is a non-imaging light collector device.

8. A light collector device, comprising:
    at least two lenses, wherein each of the at least two lenses includes:
        a first side through which light enters; and
        a second side through which light exits; and
    a single photodetector, wherein:
        the single photodetector is positioned in direct contact with the second side of each of the at least two lenses through which light exits; and
        the single photodetector is positioned outside of each of the at least two lenses.

9. The device of claim 8, wherein the second side of each of the at least two lenses is opposite the first side of that respective lens.

10. The device of claim 8, wherein the at least two lenses are Fresnel lenses.

11. The device of claim 8, wherein the first side of each of the at least two lenses is a substantially similar length away from the single photodetector.

12. The device of claim 8, wherein the single photodetector includes a p-n junction.

13. A method of operating a light collector device, comprising:
    propagating light through a plurality of Winston cones of the light collector device, wherein:
        the light enters the plurality of Winston cones through a first side of each respective Winston cone, wherein the first side has a first length
        the light exits the plurality of Winston cones through a second side of each respective Winston cone, wherein the second side is opposite the first side and has a second length that is less than the first length; and
    illuminating, by the light after the light propagates through the plurality of Winston cones, a single detector of the light collector device, wherein:
        the single detector is positioned in direct contact with the second side of each of the plurality of Winston cones through which the light exits; and
        the single detector is positioned outside of each of the plurality of Winston cones.

14. The method of claim 13, wherein the method includes concurrently propagating the light through the plurality of Winston cones.

* * * * *